United States Patent [19]
Kim

[11] Patent Number: 6,016,175
[45] Date of Patent: Jan. 18, 2000

[54] LIQUID CRYSTAL DISPLAY

[75] Inventor: Sung Kon Kim, Kyungsangbook-do, Rep. of Korea

[73] Assignee: LG Electronics Inc., Seoul, Rep. of Korea

[21] Appl. No.: 09/004,277

[22] Filed: Jan. 8, 1998

[30] Foreign Application Priority Data

Jan. 28, 1997 [KR] Rep. of Korea .......................... 97-2447

[51] Int. Cl.[7] ................................................. G02F 1/1333
[52] U.S. Cl. ................................................. 349/58; 349/65
[58] Field of Search ........................ 349/58, 65; 348/825, 348/836; 361/681, 724, 805

[56] References Cited

U.S. PATENT DOCUMENTS

| 4,626,074 | 12/1986 | Crossland et al. ...................... 350/345 |
| 5,280,372 | 1/1994 | Horiuchi .................................... 359/49 |
| 5,619,351 | 4/1997 | Funamoto et al. ...................... 349/61 |
| 5,729,310 | 3/1998 | Horiuchi et al. ......................... 349/58 |
| 5,815,224 | 9/1998 | Hasegawa et al. ....................... 349/58 |

FOREIGN PATENT DOCUMENTS

| 0 225 977 A2 | 6/1987 | European Pat. Off. . |
| 0 375 293 A2 | 6/1990 | European Pat. Off. . |
| 0 375 293 A3 | 6/1990 | European Pat. Off. . |
| 0 225 977 B1 | 7/1991 | European Pat. Off. . |
| 0 545 429 A2 | 6/1993 | European Pat. Off. . |
| 0 545 429 A3 | 6/1993 | European Pat. Off. . |
| 0 573 268 A2 | 12/1993 | European Pat. Off. . |
| 0 573 268 A3 | 12/1993 | European Pat. Off. . |
| 8-334764 | 12/1996 | Japan . |
| WO 90/04806 | 5/1990 | WIPO . |

*Primary Examiner*—James A. Dudek
*Attorney, Agent, or Firm*—Morgan, Lewis & Bockius LLP

[57] ABSTRACT

A liquid crystal display includes a back light unit having a light guide and a light reflector; a liquid crystal display panel having first and second substrates, liquid crystal between the first and second substrates, and switching elements; and a frame having projecting portions for fastening and determining positions of the back light unit and the liquid crystal display panel. The projecting portions are formed at the side of the frame as one body of the frame with spaces from the bottom of the frame such that the back light unit is placed in the spaces, and the liquid crystal display panel is placed on the projecting portions.

7 Claims, 9 Drawing Sheets

LIQUID CRYSTAL DISPLAY

This application claims the benefit of Application No. P97-2447, filed in Korea on Jan. 28, 1997, which is hereby incorporated by reference.

BACKGROUND OF THE INVENTION

1. Field of the Invention

The present invention relates to a liquid crystal display of superior quality which has fewer components and a simpler manufacturing process than the conventional LCD, and particularly, to a frame of the LCD fastening and determining positions of a back light unit and a liquid crystal panel.

2. Discussion of the Related Art

Liquid crystal displays (LCDs) are very widely used in environments such as offices, schools, libraries and homes. The LCD has easy portability due to its light weight and small size. The LCD is widely used as a display device in personal computers, audio visual (AV) systems, portable computers, game machines, and simulators. Active research has focused on the development of an LCD with a simplified manufacturing process, reduced number of components, reduced manufacturing time, and thinner design, thereby reducing prices.

In a conventional LCD, a back light and a liquid crystal display panel are fixed to a frame. The back light unit includes a light reflecting sheet attached to one face of a light guide, a diffusing sheet and a light condensing sheet attached to the other face of the light guide, and a light reflector having a lamp therein and partially enclosing one side of the light guide. The liquid crystal display panel includes two glass substrates, switching elements formed on the inner surface of one of the two glass substrates, liquid crystal injected between the two glass substrates and polarizing plates attached on each outer surface of the two substrates.

The conventional LCD will now be explained with reference to FIGS. 1–7.

Figure 1:
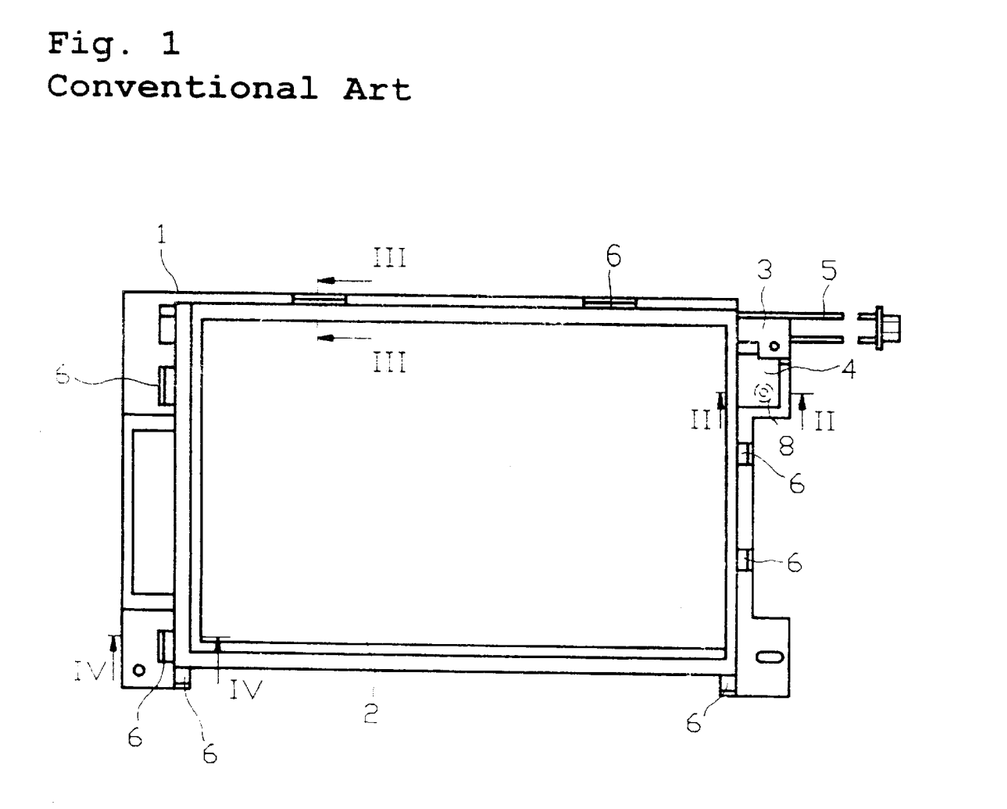
FIG. 1 is a plane view showing a back light unit and a liquid crystal panel fastened to a frame in a conventional LCD.

As shown in FIG. 1, a light guide 4 and a light reflector 3 are fixed to a frame 1. On the light guide 4 and the light reflector 3, the position of a liquid crystal display panel 2 is determined by the frame 1. The light guide 4 is fixed by a screw 8. A wire 5 received from a lamp (not shown) is provided in the light reflector 3. A position determiner 6 is also provided for the liquid crystal display panel 2.

Figure 2:
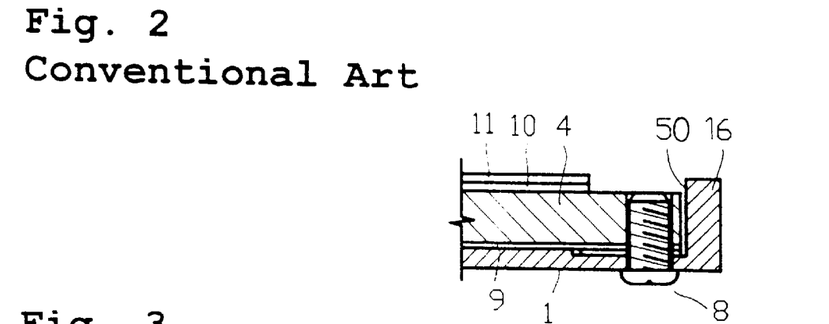
FIGS. 2, 3 and 4 are cross-sectional views taken along lines II—II, III—III, and IV—IV of FIG. 1, respectively.
Figure 3:
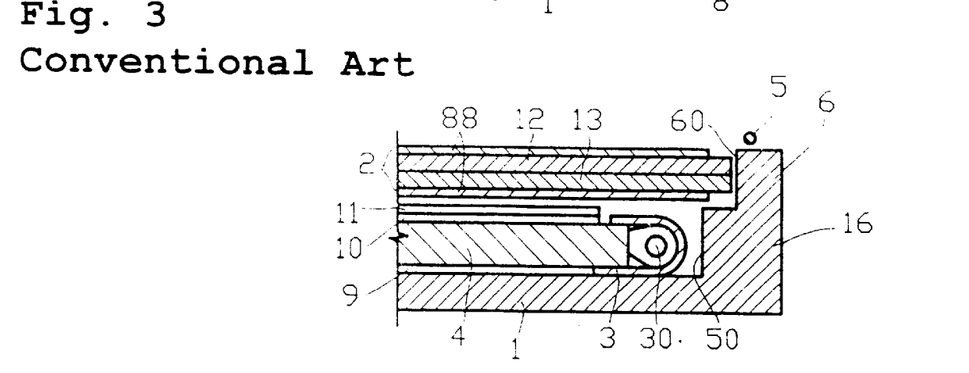
Figure 4:
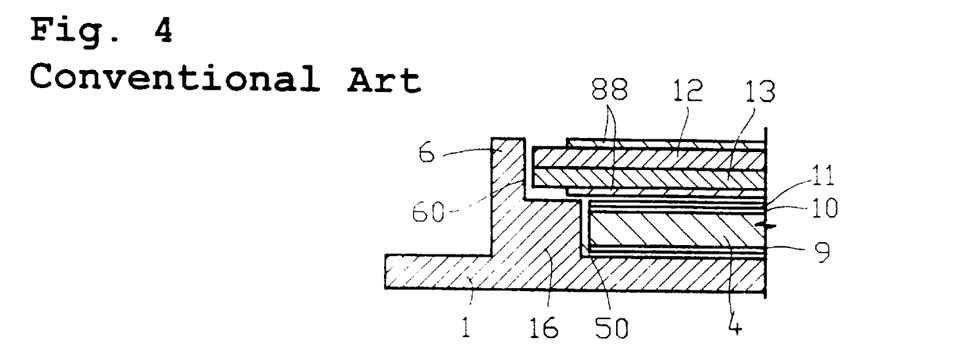

The conventional LCD is depicted in FIGS. 2, 3, and 4 which are cross-sectional views taken along lines II—II, III—III, and IV—IV, respectively.

FIG. 2 shows a light diffusing sheet 10 and a light condensing sheet 11 which are layered and attached to one surface of the light guide 4. A light reflecting sheet 9 is attached onto the other surface of the light guide 4. A standing side 16 of the frame 1 determines the location of the light guide 4 with an inner portion 50, and a screw 8 fixes the light guide 4 to the frame 1.

FIG. 3 shows the light diffusing sheet 10 and the light condensing sheet 11 layered on one surface of the light guide 4. The light reflecting sheet 9 is attached to the other surface of the light guide 4. A U-shaped light reflector 3, having a lamp 30 therein, sandwiches the edge of the light guide 4. The position of the light guide 4 is determined by the lower inner portion 50 of the standing side 16 of the frame 1. A liquid crystal display panel 2 which includes two substrates 12 and 13 and polarizing plates 88 attached to the outer surfaces of each substrate is located next to a upper inner portion 60 of the standing side 16. The standing side 16 of the frame 1 has an inner portion resembling a staircase, of which first step 50 determines the position of the light guide 4 and the second step 60 determines the position the liquid crystal display panel 2.

In FIG. 4, the light diffusing sheet 10 and the light condensing sheet 11 are layered on one surface of the light guide 4. The light reflecting sheet 9 is attached to the opposite surface of the light guide 4. The position of the light guide 4 is determined by the first step 50 of the standing side 16 of the frame 1. The position of a liquid crystal display panel 2 which includes two substrates 12 and 13 and polarizing plates 88 attached to the outer surfaces of each substrate is determined by the second step 60 of the standing side 16.

Figure 5:
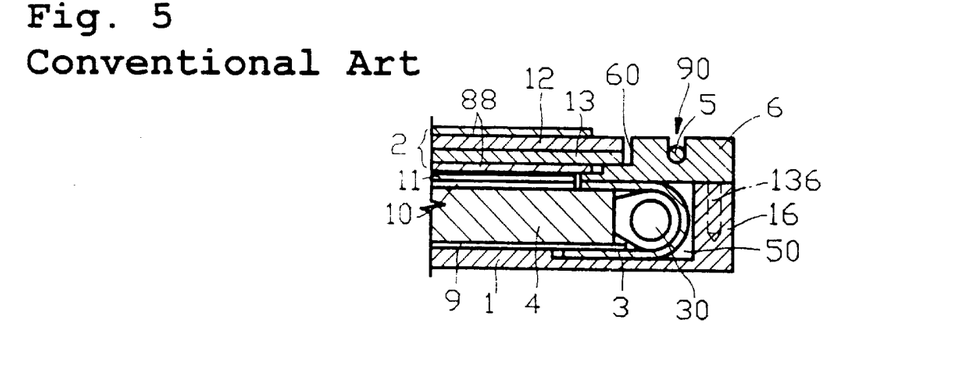
FIG. 5 is a cross-sectional view of a modified structure corresponding to FIG. 3.

FIG. 5 shows a modification of the structure from FIG. 3. Here, the light diffusing sheet and the light condensing sheet 11 are layered on one surface of the light guide 4. The light reflecting sheet 9 is attached to the opposite surface of the light guide 4. A U-shaped light reflector 3, having the lamp 30 therein, partially encloses the light guide 4 and the light reflecting sheet 9. The position of the light guide 4 is determined by the standing side 16 of the frame 1. A separate position determiner 6' for the liquid crystal display panel 2 is fixed on the standing side 16 with adhesives or a pin 136. The light reflector 3 enclosing the light guide 4 is fixed to the frame 1 by placing it into a gap between the bottom the frame 1 and the separate position determiner 6' for the liquid crystal display panel 2. A inner portion 60 of the position determiner 6' determines the position of the liquid crystal display panel 2. A wire 5 coming from the lamp 30 is hung on a groove 90 of the position determiner 6'.

As shown in FIGS. 3 and 4, the positions of the light guide 4 and the liquid crystal display panel 2 in a conventional LCD are determined by only the standing side 16 of the frame having a stepped wall. As a result, they are not securely fixed and easily moved by even a minor impact. Therefore, they are easily damaged.

In order to solve this problem, a screw 8 is used to fix the light guide 4 as shown in FIG. 1. This, however, requires an additional area for the screw in the frame 1 and the light guide 4, making the design structure thereof complicated, and resulting in the deterioration of uniform illumination. As a result of the accommodations required for the screw, the manufacturing process becomes lengthier and manufacturing costs are thereby increased.

Referring to FIG. 5 showing an improvement of FIG. 3, a separate position determiner 6' for the liquid crystal display panel 2 is created and fixed on the standing side 16 of the frame 1 with adhesives or a pin 136. However, other problems still exist in that the separate position determiner 6' for the liquid crystal display panel 2 is easily detached from the standing side 16 by a minor impact during the manufacturing process, resulting in the scattering and damaging of components. As a result thereof, the quality of the LCD is diminished.

As described above, the creation of the separate position determiner 6' requires an additional manufacturing step, thereby increasing in manufacturing costs.

A further improved frame in the conventional LCD is disclosed in Japanese Patent Publication No. 5-66390. A supporter is created apart from the frame and fixed to the edge of the frame by a projecting portion of the frame. A back light unit and a liquid crystal display panel fix in place. A more detailed description will now be provided with reference to FIGS. 6 and 7.

Figure 6:
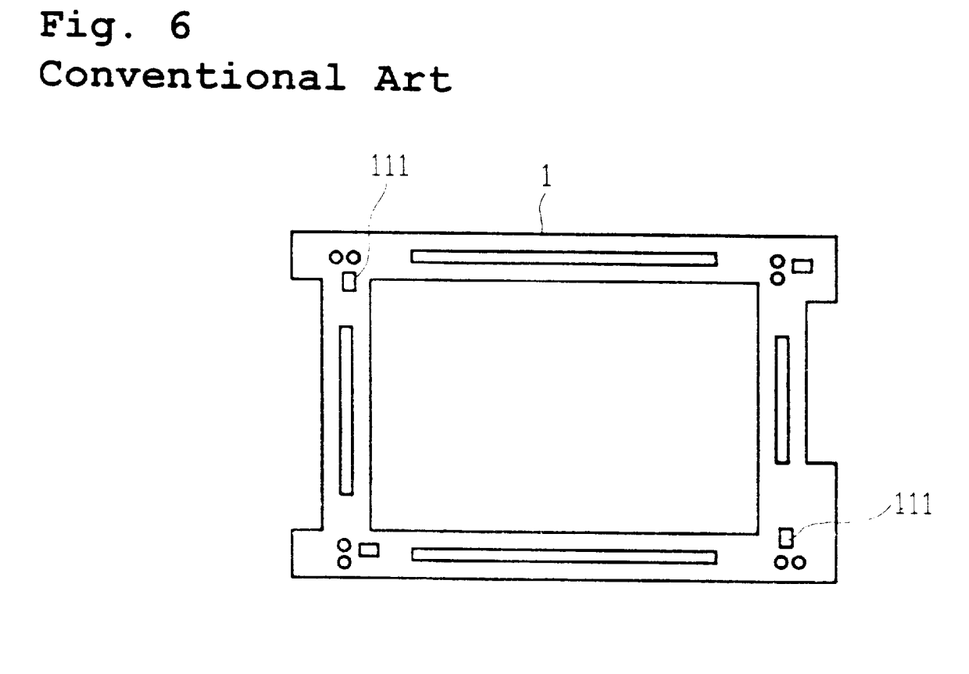
FIG. 6 is a plane view of a frame in a conventional LCD.
Figure 7:
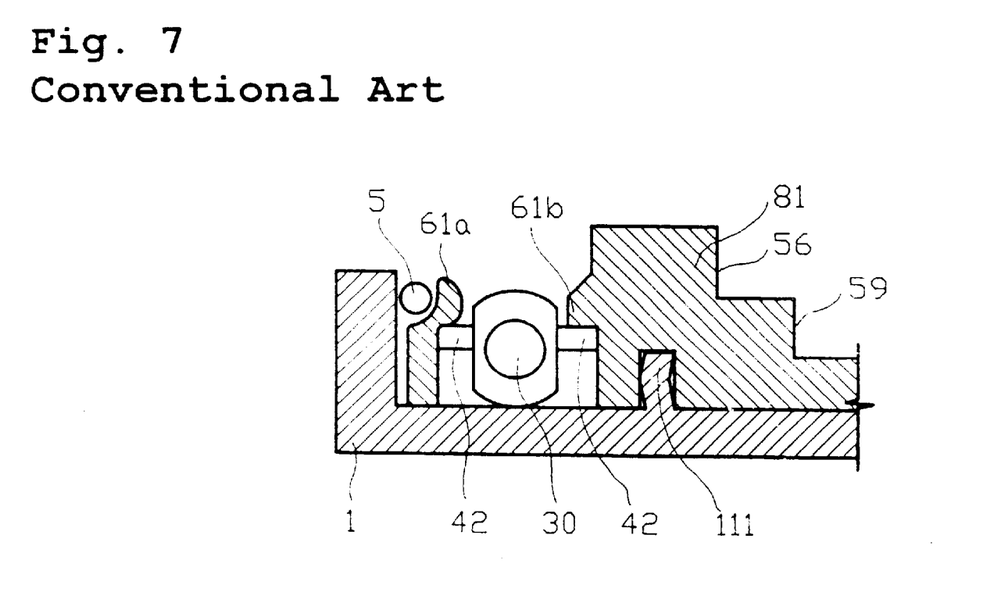
FIG. 7 is a cross-sectional view of FIG. 6 which shows a frame and a supporter for fastening a back light unit and a liquid crystal display panel.

As shown in FIGS. 6 and 7, the projecting part 111 of the frame 1 is locked with the supporter 81 at the edge of the frame 1. The position of a lamp 30 connected to the light guide is determined by a pair of projecting portions 61a and 61b projecting from the supporter 81 and a pair of projecting parts 42 projecting from the lamp 30. A space is formed between the projecting portion 61a and the side wall of the frame 1, in which a wire 5 from the lamp 30 is hung.

The supporter 81 has a stair-like profile of which the first step 59 determines the position of the light guide and the second step 56 determines the position of the liquid crystal display panel, respectively.

The supporter 81 and the projecting part 111 which fix and determine the position of the back light unit and the liquid crystal display panel, become easily detached from each other during the manufacturing process, resulting in the unstable positioning of the back light unit and liquid crystal display panel.

In addition, an additional step for locking the supporter 81 to the frame 1 is required, thereby increasing manufacturing time and cost.

SUMMARY OF THE INVENTION

Accordingly, the present invention is directed to a liquid crystal display that substantially obviates one or more of the problems due to the limitations and disadvantages of the related art as discussed above.

An object of the present invention is to provide a liquid crystal display having a back light unit and a liquid crystal display panel with a frame wherein assembly time is reduced.

Another object of the present invention is to provide a liquid crystal display wherein a back light unit is firmly attached to the frame.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the liquid crystal display comprises a back light unit including a light guide and a light reflector; a liquid crystal display panel including first and second substrates, liquid crystal between the first and second substrates, and switching elements; and a frame including projecting portions for fastening and determining positions of the back light unit and the liquid crystal display panel; wherein the projecting portions are formed at the side of the frame as one body with the frame with spaces from the bottom of the frame, the back light unit is placed in the spaces, and the liquid crystal display panel is placed on the projecting portions.

In another aspect, liquid crystal display comprises a back light unit including a light guide, a lamp, and a U-shaped light reflector; a liquid crystal display panel including first and second substrates, liquid crystal between the first and second substrates, and switching elements; and a frame including projecting portions formed integrally from a side of the frame for positioning the back light unit and the liquid crystal display panel, the projecting portions defining a space beneath the projecting portion adjacent to a bottom portion of the frame, wherein the back light unit is received into the space, and wherein the liquid crystal display panel is positioned on the projecting portions.

In yet another aspect, the liquid crystal display comprises a back light unit having a light guide and a light reflector; a liquid crystal display panel having a first substrate, a second substrate, liquid crystal, and switching elements; and a frame for supporting and determining the positions of the back light unit and the liquid crystal display panel in parallel. Part of the frame projects out from its side over the bottom of the frame, creating a gap between the projecting part and the bottom of the frame. The back light unit is positioned in the gap, and the liquid crystal display panel is placed on the top of the projecting part.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 8:
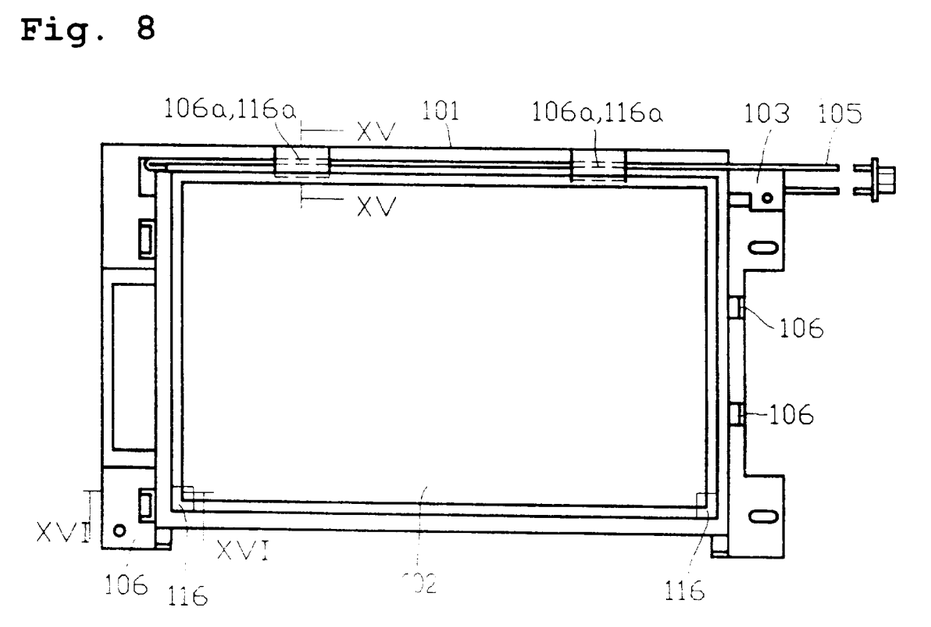
FIG. 8 is a plane view of a back light unit and a liquid crystal display panel fastened to a frame according to one embodiment of the present invention.
Figure 9:
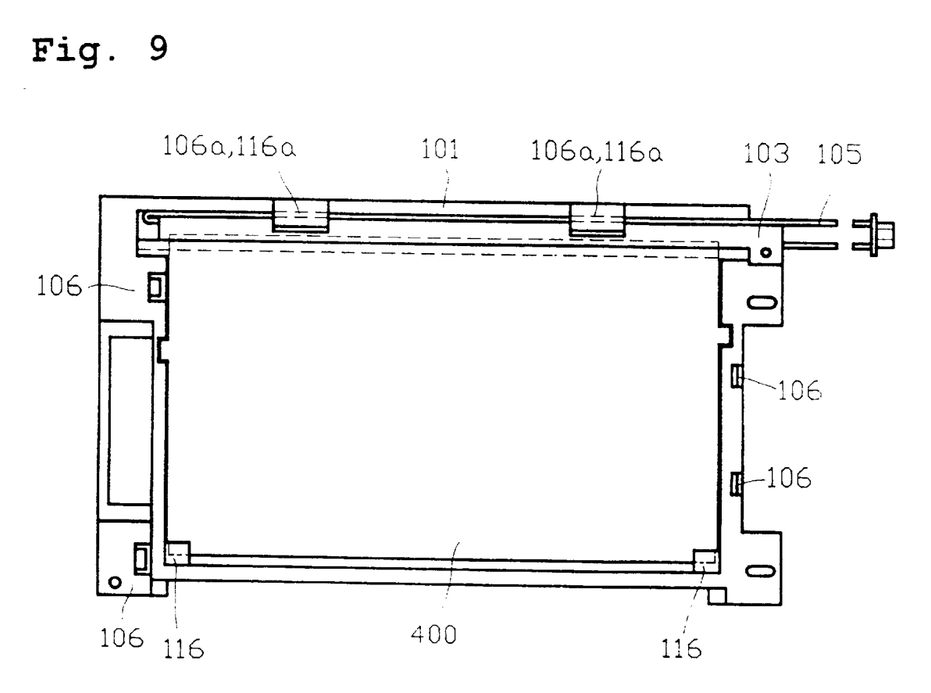
FIG. 9 is a plane view of a back light unit and a liquid crystal display panel fastened to a frame according to the other embodiment of the present invention.
Figure 10:
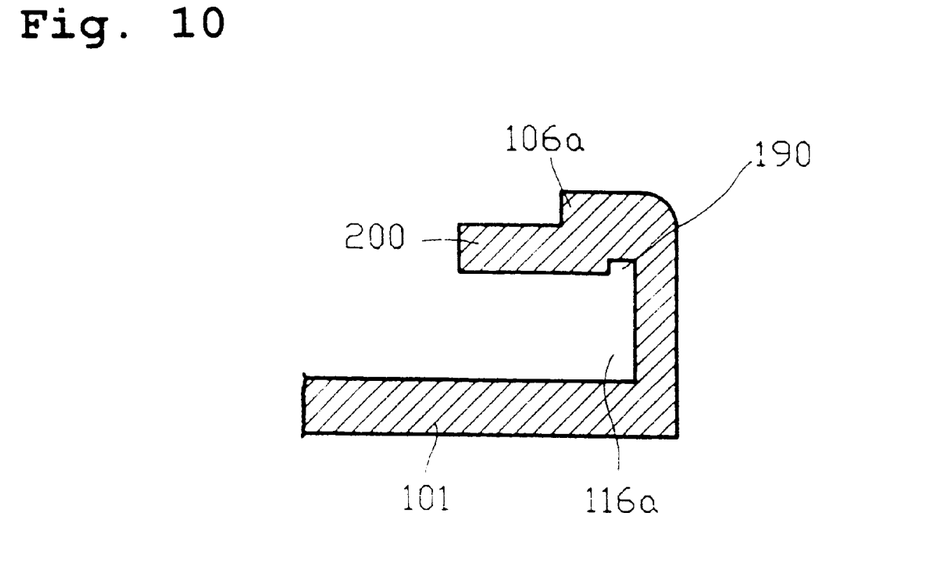
FIGS. 10 and 11 are cross-sectional views of projecting parts formed at the side of a frame according to the present invention.
Figure 11:
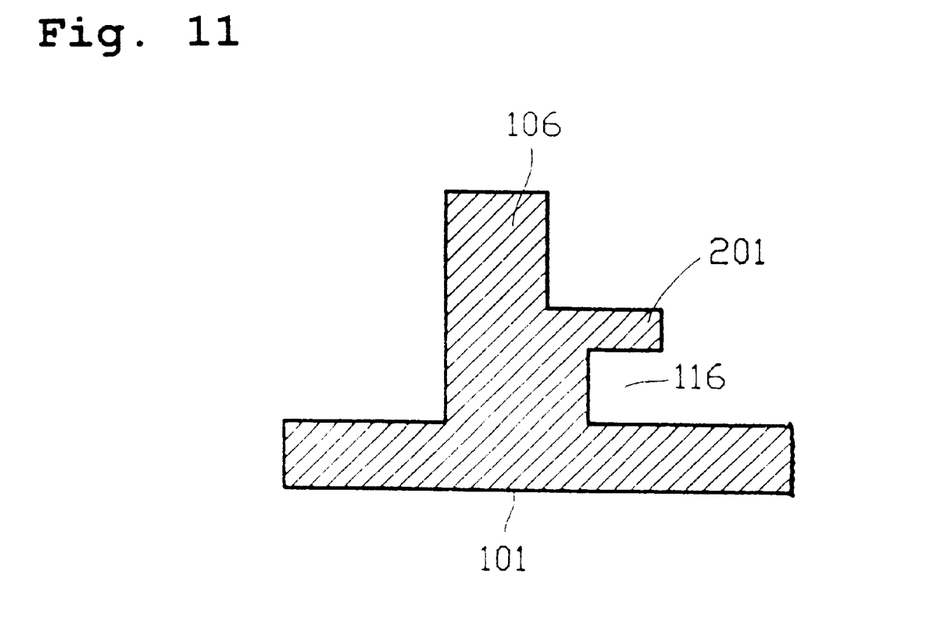
Figure 12:
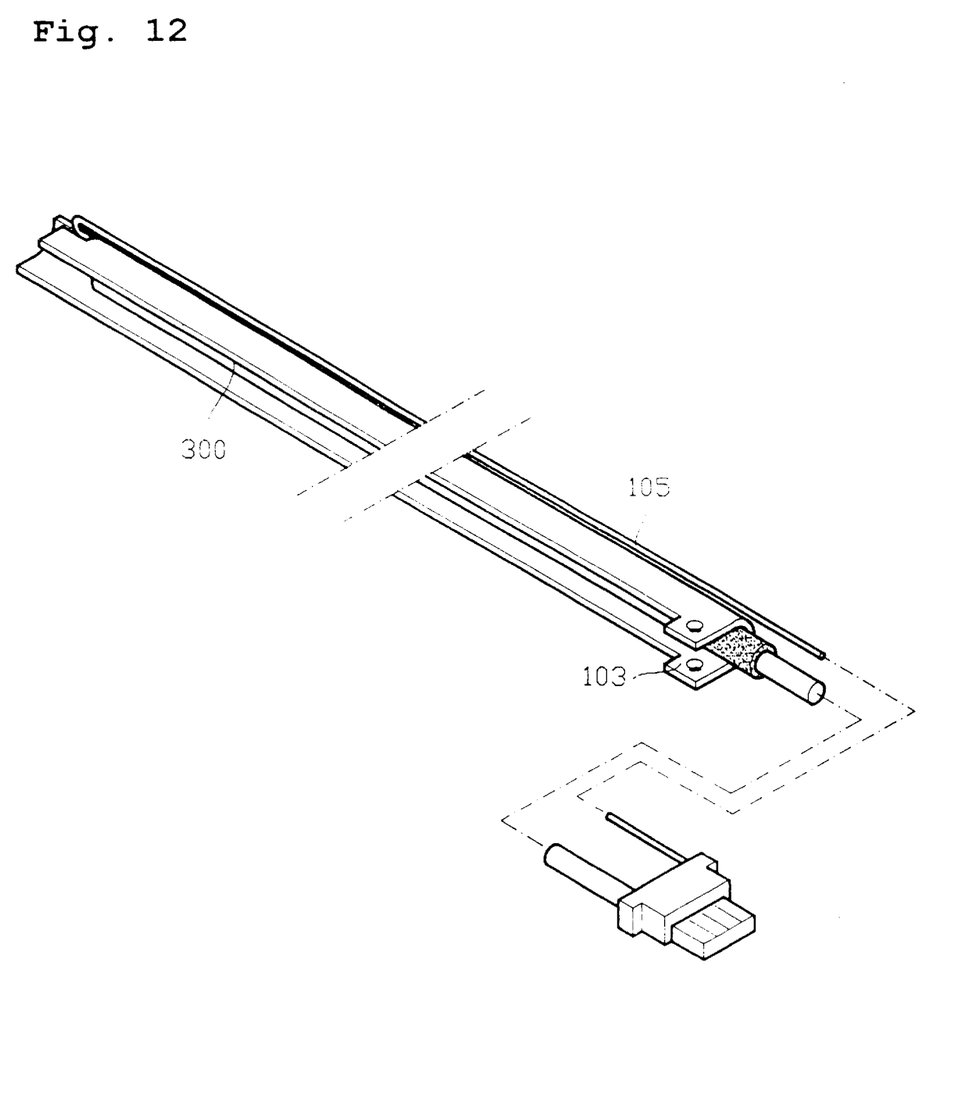
FIG. 12 is a three-dimensional view of a light reflector with a lamp thereinto.
Figure 13:
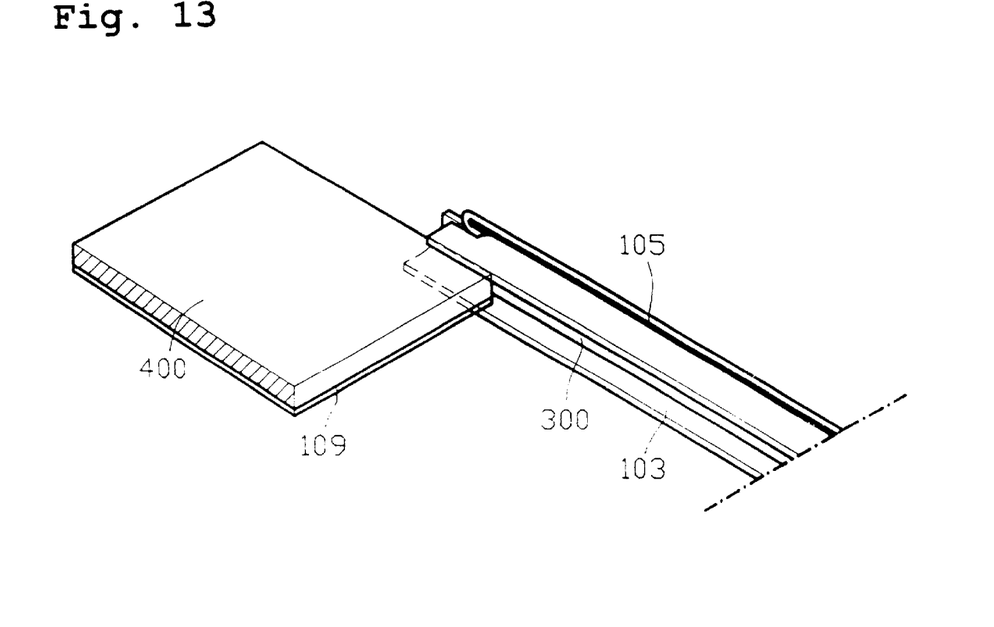
FIG. 13 is a three-dimensional view showing how a light guide and a light reflecting sheet are placed into a light reflector.
Figure 14:
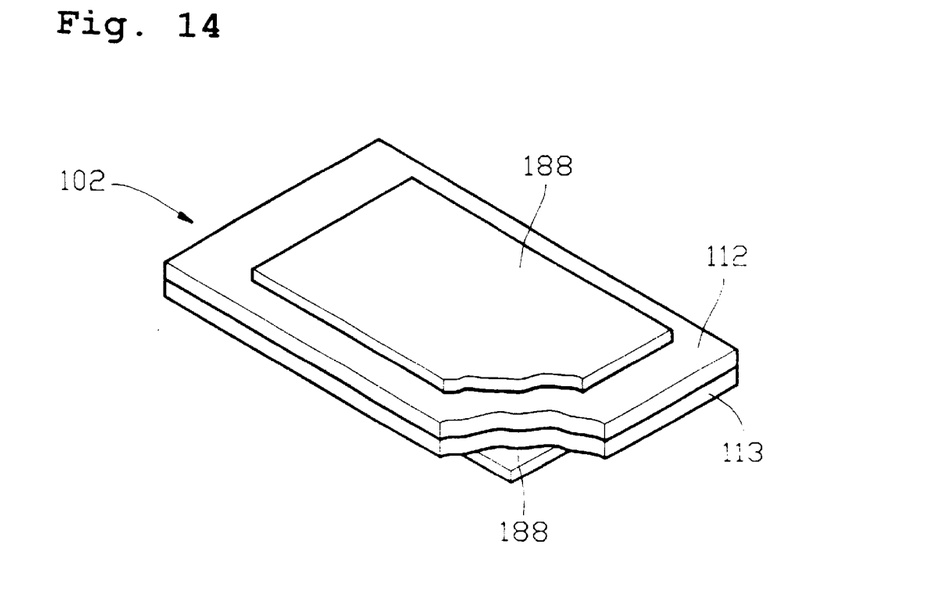
FIG. 14 is a three-dimensional view of a liquid crystal display panel.
Figure 15:
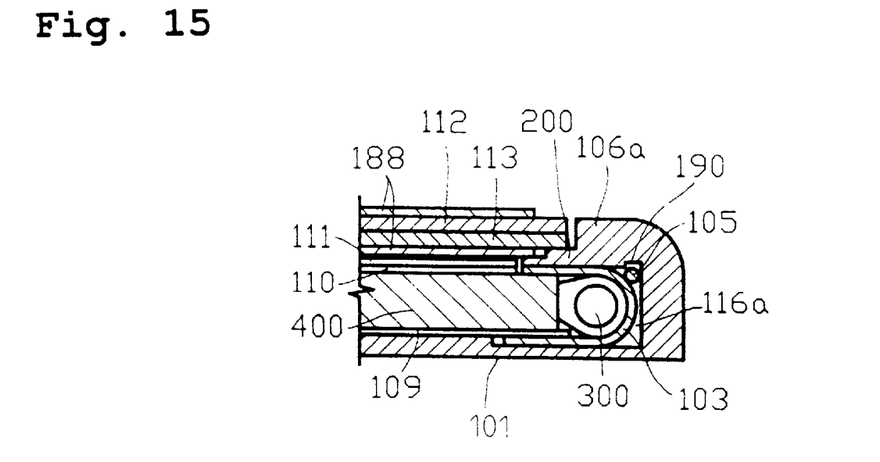
FIG. 15 is a cross-sectional view taken along line XV—XV of FIG. 8.
Figure 16:
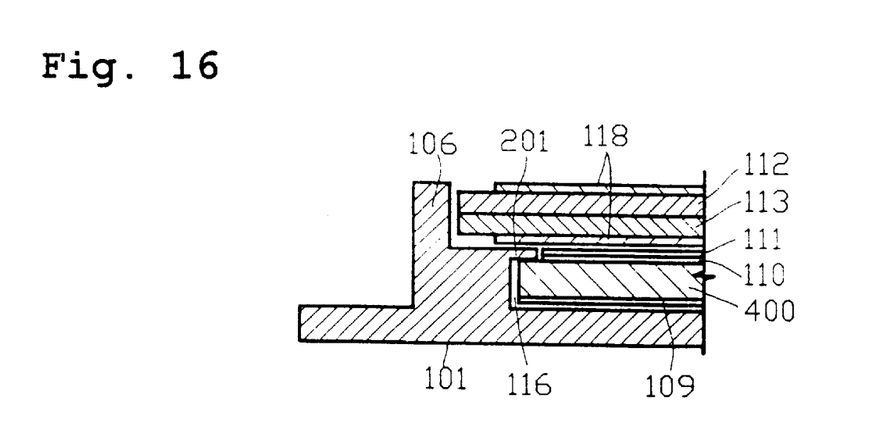
FIG. 16 is a cross-sectional view taken along line XVI—XVI of FIG. 8.
Figure 17:
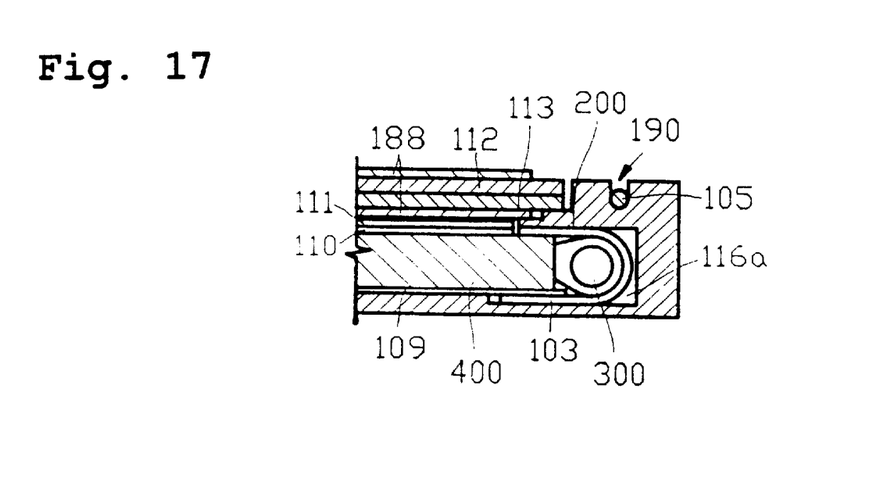
FIG. 17 is a cross sectional view of a modified structure from FIG. 15.

FIG. 8 is a plane view showing a back light unit and a liquid crystal display panel each fastened to a frame. FIG. 9 is a plane view showing the back light unit fastened to the frame. FIGS. 10 and 11 are cross-sectional views of a frame and a projecting part formed at the side of the frame as one body. FIG. 12 is a three-dimensional view showing a lamp placed into a light reflector. FIG. 13 is a three-dimensional view showing how to fasten the light guide and the light reflector to the frame. FIG. 14 is a three-dimensional view of a liquid crystal display panel. FIGS. 15 to 17 are cross-sectional views of the back light unit and the liquid crystal display panel fastened to the frame.

The LCD according to the present invention comprises of a frame which supports and determines the positions of a back light unit and a liquid crystal display in parallel. A portion of the frame projects over the bottom of the frame creating a space, wherein the back light unit is positioned. The liquid crystal display panel is positioned on the projecting part. Hence, the light guide and the frame are less complicated and smaller than conventional structures in which the light guide is fixed by a screw.

As will be disclosed in one embodiment, a U-shaped light reflector 103 has a lamp (not shown) therein and partially encloses one edge of a light guide 400. The position of the light reflector 103 is determined by a space 116a between the bottom of the frame 101 and a projecting part 200. The opposite side of the light guide 400 is positioned in a space 116 between the bottom of the frame 101 and a projecting part 201. The position of the liquid crystal display panel 102 is determined by a stair-like profile 106a on the projecting part 200 and a stair-like profiled 106 on the projecting part 201.

A first embodiment according to the present invention will now be described.

As shown in FIGS. 8 and 9, an LCD of the present invention comprises a liquid crystal display panel 102; a back light unit (including a light reflector 103, a lamp (not shown) placed into the light reflector 103 and a light guide 400) placed under the liquid crystal display panel in parallel and irradiating; and a plastic frame 101 supporting and determining the positions of the liquid crystal display panel and the back light unit.

Spaces 116 and 116a and stepped profiles 106 and 106a are formed at the side of the frame 101, supporting and determining positions of the back light unit and the liquid crystal display panel.

The spaces 116 and 116a and the stepped profiles 106 and 106a are formed by the projecting parts 200 and 201 as shown in FIGS. 10 and 11.

The space 116a between the bottom of the frame 101 and the projecting part 200 functions as a position determiner for the light reflector 103. A stepped profile 106a on the projecting part 200 functions as a position determiner for the liquid crystal display panel 102. A groove 190 is formed in the projecting part 200, functioning as a position determiner for an input and output wire 105.

The space 116 between the bottom of the frame 101 and the projecting part 201 functions as a position determiner for the light guide 400. The stepped profile 106 on the projecting part 201 functions as a position determiner for the liquid crystal display panel 102. A groove 190, functioning as the position determiner for the wire 105, is alternatively formed on the projecting part 200 as shown in FIG. 17.

Referring to FIGS. 15 and 16 taken along lines XV—XV and XVI—XVI in FIG. 8, respectively, the back light unit includes the light guide 400, a light reflecting sheet 109, a light diffusing sheet 110, a light condensing sheet 111, the light reflector 103, the lamp 300 and the input/output wire 105.

The back light unit has the light reflecting sheet 109 attached onto one surface of the light guide 400 of which one edge is enclosed by the U-shaped light reflector 103. The U-shaped light reflector 103 has the lamp 300 placed therein and the wire 105 comes from the lamp 300. The light guide 400 has a light diffusing sheet 110 and a light condensing sheet 111 attached onto the other surface thereof.

The liquid crystal display panel 102 comprises of a pair of transparent glass substrates 112 and 113, switching elements formed on the surface of one of the substrates, liquid crystal injected therebetween, and polarizing plates 188 attached to the outer surfaces of each substrate.

The method of determining the positions of each of the components of the LCD and fastening them to the frame 101 will be described below. First, the method for how to fasten the back light unit to the frame 101 will be described with reference to FIGS. 12 and 13.

The lamp 300 is positioned into the U-shaped light reflector 103. Then, the light guide 400 and the light reflecting sheet 109 attached to the light guide 400 are positioned into the space 116 between the frame 101 and the projecting part 201. The opposite side of the light guide 400 is partially enclosed within the U-shaped light reflector 103 as shown in FIG. 13. The light reflector 103 is put into the space 116a, between the frame 101 and the projecting part 200. At this time, the wire 105 coming from the lamp 300 is placed in the groove 190. After the light guide 400 partially enclosed by the light reflector 103 is fastened to the frame 101, a light diffusing sheet 110 and a light condensing sheet 111 are layered and attached onto the light guide 400.

FIGS. 9, 15 and 16 show how the back light unit is fastened to the frame 101. Alternatively, the groove 190, which functions as the position determiner for the wire 105 coming from the lamp 300, is formed on the top of the projecting part 200 as shown in FIG. 17.

Unlike conventional devices, no additional area for screwing the light guide to the frame is required according to the present invention. In addition, the design and structure of the light guide and the frame are simplified. Further, the manufacturing time is reduced because the screwing step is unnecessary.

The LCD of the present invention has a more stable construction than the conventional LCD shown in FIG. 7 because the position determiner for the back light is formed in one body with the frame 101. Therefore, there is no possibility of the position determiner breaking away from the frame.

After fastening the back light unit to the frame, the liquid crystal display panel 102, which includes a pair of transparent glass substrates 112 and 113, liquid crystal between the two glass substrates and polarizing plates 188 attached onto the outer surfaces of each substrate, is placed. The position of the liquid crystal display panel 102 is determined by a stair-like profile 106a, on the projecting part 200 of the frame 101 and a stepped profile 106, on the projecting part 102 of the frame 101.

Thus, the present invention provides a simpler manufacturing process with reduced manufacturing time as compared to the conventional device shown in FIG. 5 in which a separate position determiner 6' is fixed to the frame by adhesives or a pin 136.

Figure 18:
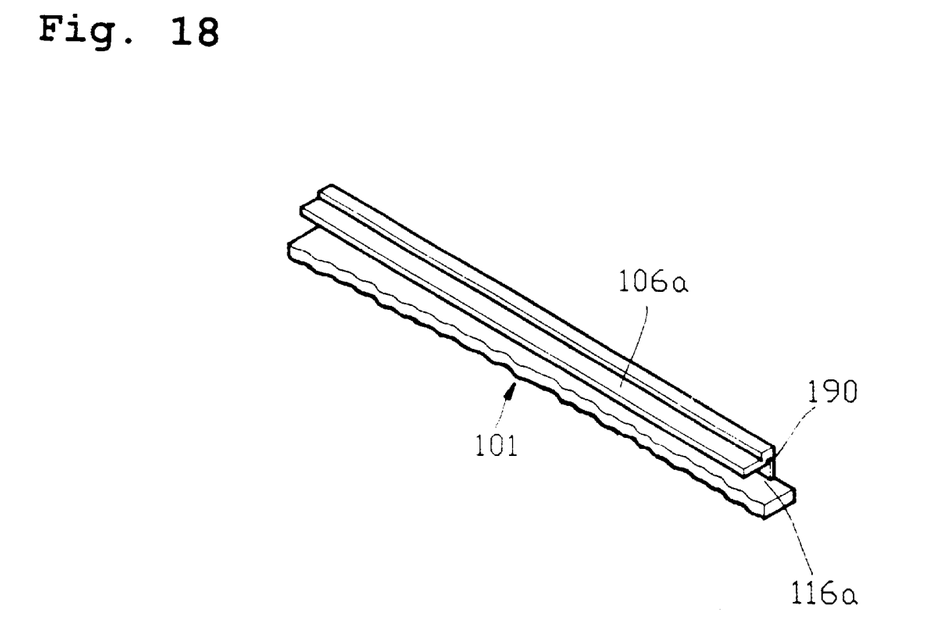
FIGS. 18 and 19 are three-dimensional views showing the modifications of a frame according to the present invention.
Figure 19:
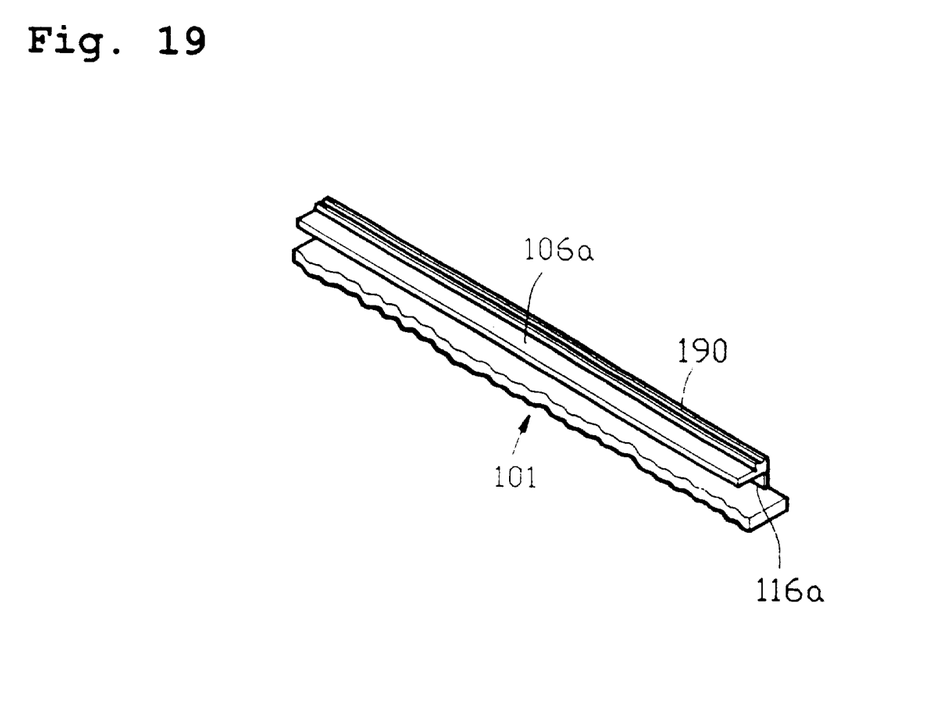

As shown in FIGS. 18 and 19, various modifications of the frame having position determiners as one body are applicable for the LCDs.

Referring to FIGS. 15 and 16, the frame in the LCD of the present invention has projecting parts 200 and 201 as one body thereof. The projecting parts 200 and 201 are formed with spaces 116 and 116a from the frame, functioning as position determiners for the back light unit. The projecting parts 200 and 201 also have stepped profiles 106 and 106a, and functioning as position determiners for the liquid crystal panel 102. As a result, the light guide and the frame in the LCD of the present invention have a simplified design and smaller area as compared with those used in the conventional LCDs. In addition, the present invention does not need a separate position determiner, screw, adhesives, or pin, thereby reducing assembly time. Further, the assembled parts of the LCD do not break away from the frame by any impact occurring during the manufacturing process because the frame and the position determiners are in one body. That is, the assembled components in the present invention cannot become loosened by a minor impact because the frame an d the supporter are formed in one body rather than assembled components. Moreover, the frame has a groove as one body thereof for fastening the wire coming from the lamp. Accordingly, there is no need to use any adhesive tape for fastening the wire to the frame. In addition, no additional step of fixing the wire onto the frame is needed because the wire is simultaneously fastened to the frame when the back light is fixed to the frame.

It will be apparent to those skilled in the art that various modifications and variations can be made in the liquid crystal display of the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:

a back light unit including a light guide and a light reflector;

a liquid crystal display panel including first and second substrates, liquid crystal between the first and second substrates, and switching elements; and a frame including a bottom portion, a side wall portion, and projecting portions having top and bottom surfaces parallel to the bottom portion for fastening and determining positions of the back light unit and the liquid crystal display panel;

wherein the projecting portions project from the side wall portion of the frame such that the bottom portion, the side wall portion and the projecting portions are formed as one body, the back light unit being received into spaces defined between the bottom surface of the projecting portions and the bottom portion, and the liquid crystal display panel is disposed on the projecting portions and wherein a position determiner for a wire coming from a lamp is formed in one of the spaces between one of the projecting portions and the bottom of the frame.

2. The liquid crystal display according to claim 1, wherein the projecting portions have stair-like profiles, and the liquid crystal display panel is positioned by the stair-like profiles.

3. The liquid crystal display according to claim 1, wherein the light reflector is placed in one of the spaces between one of the projecting parts and the bottom of the frame.

4. The liquid crystal display according to claim 3, wherein the light reflector sandwiches one side of the light guide and has a lamp placed therein.

5. The liquid crystal display according to claim 4, wherein the light reflector is U-shaped.

6. The liquid crystal display according to claim 1, wherein the position determiner for the wire is formed in one body with the frame.

7. The liquid crystal display according to claim 1, wherein the frame is made of plastic.

* * * * *